United States Patent
Ding et al.

(10) Patent No.: US 11,398,108 B2
(45) Date of Patent: Jul. 26, 2022

(54) FINGERPRINT DETECTING DEVICE, FINGERPRINT DETECTING CIRCUIT AND DRIVING METHOD THEREOF, AND DISPLAY APPARATUS

(71) Applicant: BOE TECHNOLOGY GROUP CO., LTD., Beijing (CN)

(72) Inventors: Xiaoliang Ding, Beijing (CN); Haisheng Wang, Beijing (CN); Yingming Liu, Beijing (CN); ChihJen Cheng, Beijing (CN); Wei Liu, Beijing (CN); Xueyou Cao, Beijing (CN); Pengpeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 715 days.

(21) Appl. No.: 16/316,789

(22) PCT Filed: Apr. 12, 2018

(86) PCT No.: PCT/CN2018/082794
§ 371 (c)(1),
(2) Date: Jan. 10, 2019

(87) PCT Pub. No.: WO2019/037441
PCT Pub. Date: Feb. 28, 2019

(65) Prior Publication Data
US 2021/0342564 A1    Nov. 4, 2021

(30) Foreign Application Priority Data

Aug. 24, 2017 (CN) .......................... 201710733883.0

(51) Int. Cl.
*G06V 40/13* (2022.01)
*G06V 40/12* (2022.01)
*G06F 3/042* (2006.01)

(52) U.S. Cl.
CPC .......... *G06V 40/1318* (2022.01); *G06F 3/042* (2013.01); *G06V 40/1365* (2022.01)

(58) Field of Classification Search
None
See application file for complete search history.

(56) References Cited

U.S. PATENT DOCUMENTS

2006/0182318 A1* 8/2006 Shigeta .............. G06K 9/00026
382/124
2013/0069537 A1 3/2013 Sun et al.
(Continued)

FOREIGN PATENT DOCUMENTS

CN        1450489 A       10/2003
CN      104062643 A        9/2014
(Continued)

OTHER PUBLICATIONS

First Office Action dated Jun. 19, 2019 corresponding to Chinese application No. 201710733883.0.
(Continued)

*Primary Examiner* — Joseph R Haley
(74) *Attorney, Agent, or Firm* — Nath, Goldberg & Meyer; Joshua B. Goldberg

(57) ABSTRACT

The present disclosure provides a fingerprint detecting device, including: a photosensitive sensing component, a first electrode of which is coupled to a reference signal terminal, a second electrode of which is coupled to a pull-down node; a reset component, coupled to a reset terminal and the pull-down node, configured to reset the pull-down node in a first stage; a voltage output component, coupled to the pull-down node, a selection terminal and an output terminal of the fingerprint detecting device, configured to output a voltage signal to the output terminal of the fingerprint detecting device according to the potential of the pull-down node, the first stage to a second stage, an amount
(Continued)

of change in a voltage signal output to the output terminal of the fingerprint detecting device is positively correlated with an amount of change in the potential of the pull-down node.

17 Claims, 4 Drawing Sheets

(56) References Cited

U.S. PATENT DOCUMENTS

2016/0132176 A1* 5/2016 Bae .................. G06F 3/042
                                                      345/174
2017/0278909 A1* 9/2017 Jeon .................. A61B 5/14552

FOREIGN PATENT DOCUMENTS

| CN | 104112120 A | 10/2014 |
| CN | 105913055 A | 8/2016 |
| CN | 105930827 A | 9/2016 |
| CN | 106409224 A | 2/2017 |
| CN | 106469303 A | 3/2017 |
| CN | 107480650 A | 12/2017 |

OTHER PUBLICATIONS

International Search Report dated Jun. 27, 2018 corresponding to application No. PCT/CN2018/082794.

* cited by examiner

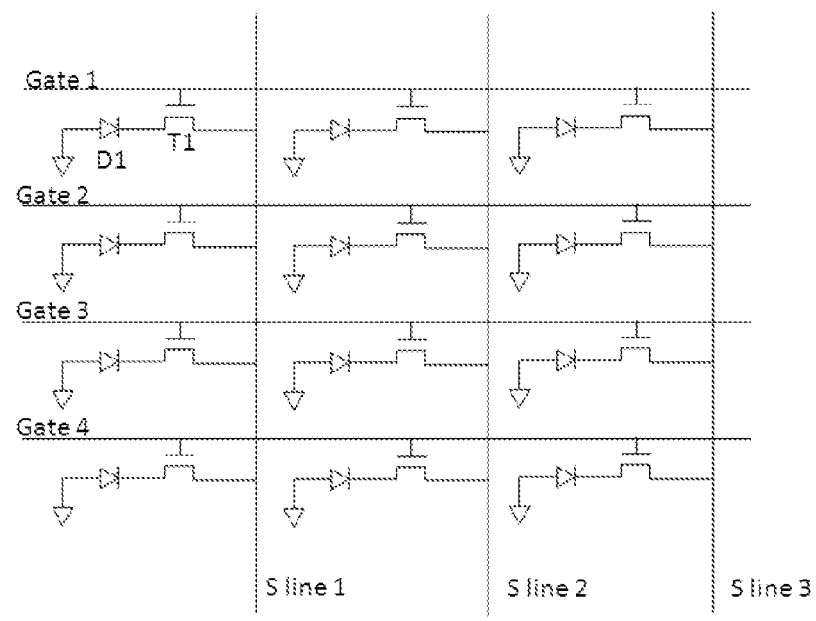
Fig. 1 (--Prior Art--)
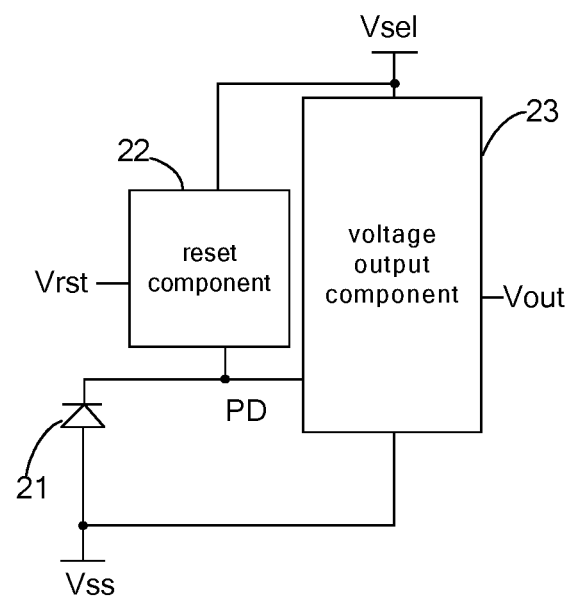
Fig. 2

A # FINGERPRINT DETECTING DEVICE, FINGERPRINT DETECTING CIRCUIT AND DRIVING METHOD THEREOF, AND DISPLAY APPARATUS

CROSS-REFERENCE TO RELATED APPLICATION

This is a National Phase application filed under 35 U.S.C. 371 as a national stage of PCT/CN2018/082794, filed on Apr. 12, 2018, claiming priority to Chinese Patent Application No. 201710733883.0 filed on Aug. 24, 2017, the disclosure of each of which is hereby incorporated by reference in its entirety.

TECHNICAL FIELD

The present disclosure relates to the field of fingerprint detection technology, and in particular to a fingerprint detecting device, a fingerprint detecting circuit and a driving method thereof, and a display apparatus.

BACKGROUND

In recent years, with the rapid development of technology, mobile products with biological recognition function have gradually entered people's lives and work. Fingerprint technology has attracted much attention because of its unique identity. Pressing type and sliding type fingerprint recognition technologies based on silicon-based processes have been integrated into mobile products. People's attention to the fingerprint recognition technology in the further is focused on the fingerprint recognition technology in a display area.

SUMMARY

An embodiment of the present disclosure provides a fingerprint detecting device, including: a photosensitive sensing component, a first electrode of the photosensitive sensing component is coupled to a reference signal terminal, and a second electrode of the photosensitive sensing component is coupled to a pull-down node; a reset component, which is coupled to a reset terminal and the pull-down node, and configured to reset a potential of the pull-down node in a first stage in which the reset terminal receives a reset signal; a voltage output component, which is coupled to the pull-down node, a selection terminal and an output terminal of the fingerprint detecting device, and configured to output a voltage signal to the output terminal of the fingerprint detecting device according to the potential of the pull-down node, and from the first stage to a second stage, an amount of change in the voltage signal output to the output terminal of the fingerprint detecting device is positively correlated with an amount of change in the potential of the pull-down node, wherein the second stage is a stage in which the selection terminal receives a selection signal and the reset terminal does not receive the reset signal.

In some implementations, from the first stage to the second stage, the amount of change in the voltage signal output from the voltage output component to the output terminal of the fingerprint detecting device is A times the amount of change in the potential of the pull-down node, where A is greater than 1.

In some implementations, the reset component includes a reset transistor, a gate of the reset transistor is coupled to the reset terminal, a first electrode of the reset transistor is coupled to the selection terminal, and a second electrode of the reset transistor is coupled to the pull-down node.

In some implementations, the voltage output component includes a selection transistor and a follower transistor; a gate and a first electrode of the selection transistor are both coupled to the selection terminal, and a second electrode of the selection transistor and a first electrode of the follower transistor are coupled to the output terminal of the fingerprint detecting device, a gate of the follower transistor is coupled to the pull-down node, and a second electrode of the follower transistor is coupled to the reference signal terminal.

In some implementations, an oxide layer of the selection transistor and an oxide layer of the follower transistor have a same unit capacitance and a same electron mobility.

In some implementations, the photosensitive sensing component is a photodiode.

In some implementations, the reference signal terminal is a low-level signal terminal.

An embodiment of the present disclosure further provides a fingerprint detecting circuit including a plurality of fingerprint detecting devices described above.

In some implementations, selection terminals of the fingerprint detecting devices of a same row are coupled to a same selection signal line, and reset terminals of the fingerprint detecting devices of a same row are coupled to a same reset signal line; output terminals of fingerprint detecting devices of a same column are coupled to a same signal reading line.

An embodiment of the present disclosure provides a driving method for the fingerprint detecting circuit described above, including a reset stage and a detecting stage, wherein in the reset stage, a reset signal is supplied to the reset terminal of each of the fingerprint detecting devices to reset the potential of the pull-down node of each of the fingerprint detecting devices, so that the voltage output component outputs a first voltage signal to the output terminal of the fingerprint detecting device based on the potential of the pull-down node; in the detecting stage, supplying of the reset signal is stopped, and selection signals are supplied to the selection terminals row by row such that each of voltage output components of the fingerprint detecting devices outputs a second voltage signal to the output terminal of corresponding one of the fingerprint detecting devices based on the potential of the pull-down node, and a difference between the first voltage signal and the second voltage signal is positively correlated with a difference between the potential of the pull-down node in the reset stage and the potential of the pull-down node in the detecting stage.

In some implementations, the reset component of fingerprint detecting device includes a reset transistor, a gate of the reset transistor is coupled to the reset terminal, a first electrode of the reset transistor is coupled to the selection terminal, and a second electrode of the reset transistor is coupled to the pull-down node, and wherein the reset stage further includes a step of supplying a selection signal to the selection terminal of each of the fingerprint detecting devices while supplying the reset signal to the reset terminal of each of the fingerprint detecting devices.

An embodiment of the present disclosure provides a display apparatus including a display panel and the fingerprint detecting circuit described above, which is provided on the display panel.

In some implementations, the display panel includes a first substrate and a second substrate provided opposite to each other, and the fingerprint detecting circuit is provided on a side of the first substrate facing the second substrate.

In some implementations, the reset component includes a reset transistor, the voltage output component includes a selection transistor and a follower transistor; the first substrate is provided with a light emitting device and a pixel driving circuit for driving the light emitting device to emit light, the pixel driving circuit includes a plurality of display transistors, wherein the reset transistor, the selection transistor and the follower transistor are provided in the same layer as the display transistors.

In some implementations, the display panel includes a first substrate and a second substrate provided opposite to each other, and the fingerprint detecting circuit is provided on a side of the second substrate facing away from the first substrate.

BRIEF DESCRIPTION OF THE DRAWINGS

The accompanying drawings are included to provide a further understanding of the present disclosure, construct a part of the specification of the present disclosure, and are used to explain the present disclosure in conjunction with the following specific implementations, but not to limit the present disclosure. In the drawings:

FIG. 1 is a schematic structural diagram of a fingerprint detecting circuit in the related art;

FIG. 2 is a schematic structural diagram of components of a fingerprint detecting device in an embodiment of the present disclosure;

BRIEF DESCRIPTION OF THE DRAWINGS

Gate1~Gate4, scanning line; Sline1~Sline3, signal reading line; D1, photodiode; T1, switching transistor; 20, fingerprint detecting device; 21, photosensitive sensing component; 22, reset component; 23, voltage output component; PD, pull-down node; Tr, reset transistor; Ts, selection transistor; Tf, follower transistor; Vsel, selection terminal; Vout, output terminal; Vrst, reset terminal; Vss, reference signal terminal; Reset1, Reset2, reset signal line; Select1, Select2, selection signal line; 30, display panel; 31, first substrate; 32, second substrate; 33, light emitting device; 34, pixel driving circuit.

DETAILED DESCRIPTION

The specific embodiments of the present disclosure are described in detail below with reference to the accompanying drawings. It should be understood that the specific embodiments described herein are only intended to explain and illustrate the present disclosure, but not to limit the present disclosure.

FIG. 1 is a schematic structural diagram of a fingerprint detecting circuit in the related art, the fingerprint detecting circuit includes a plurality of fingerprint detecting devices, each of which includes a photodiode D1 and a switching transistor T1. When recognizing a fingerprint, light irradiated on the fingerprint may be reflected differently due to difference between valleys and ridges of the fingerprint, so that intensities of light reaching the photodiode D1 are different, and different photocurrents are generated in photodiodes D1. At the same time, scanning signals are supplied to scanning lines (Gate1~Gate4) line by line, thereby the switching transistors T1 are turned on row by row, then a detecting chip reads difference between photocurrents of the photodiodes D1 from the signal reading lines (Sline1 to Slin3), thereby valleys and ridges of the fingerprint can be detected.

However, in this detection method, it is required to detect the current directly, but the difference between the currents generated by the valley and ridge is small, and under a small light intensity, the currents flowing through the signal reading lines (Sline1~Slin3) are small, and are easily interfered by noise, thereby affecting detection effect.

Figure 3:
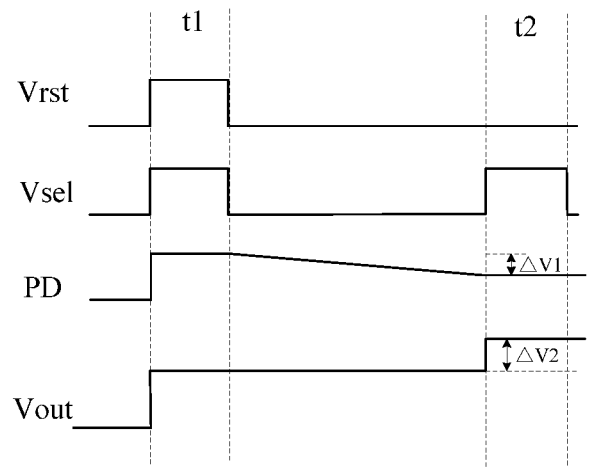
FIG. 3 is a signal timing diagram of the fingerprint detecting device of FIG. 2.

In an aspect of the present disclosure, a fingerprint detecting device 20 is provided. As shown in FIG. 2, the fingerprint detecting device 20 includes a photosensitive sensing component 21, a reset component 22, and a voltage output component 23. A first electrode of the photosensitive sensing component 21 is coupled to a reference signal terminal Vss, and a second electrode of the photosensitive sensing component 21 is coupled to a pull-down node PD. The reset component 22 is coupled to a reset terminal Vrst of the fingerprint detecting device 20 and the pull-down node PD, and configured to reset a potential of the pull-down node PD during a first stage (i.e., the stage t1 in FIG. 3) in which a reset signal is received at the reset terminal Vrst. The voltage output component 23 is coupled to an output terminal Vout of the fingerprint detecting device 20, the pull-down node PD and a selection terminal Vsel, and configured to output a voltage signal to the output terminal Vout of the fingerprint detecting device 20 according to the potential of the pull-down node PD, wherein from the first stage to a second stage, an amount of change in the voltage signal output from the voltage output component 23 to the output terminal Vout of the fingerprint detecting device 20 is positively correlated with an amount of change in the potential of the pull-down node PD. The pull-down node PD is a connection node at which the second electrode of the photosensitive sensing component 21, the reset component 22 and the voltage output component 23 are coupled to each other. The second stage is one in which no reset signal is received by the reset terminal Vrst and a selection signal is received by the selection terminal Vsel (i.e., the stage t2 in FIG. 3).

In addition, the reset component 22 may also be coupled to the selection terminal Vsel, so that when the reset signal is received at the reset terminal Vrst, the selection terminal Vsel and the pull-down node PD are electrically connected to reset the pull-down node PD by using the signal at the selection terminal Vsel.

In the first stage, the pull-down node PD is reset to reach a reset potential. At this time, the output terminal Vout of the fingerprint detecting device 20 outputs a first voltage signal. In the second stage, the light reflected by the finger is irradiated to the photosensitive sensing component 21, a sensing current is generated such that the potential of the pull-down node PD changes, the amount of change in the potential of the pull-down node PD is ΔV1, the voltage output component 23 outputs a second voltage signal to the output terminal Vout, and a difference ΔV2 between the second voltage signal and the first voltage signal is positively correlated with ΔV1. Therefore, when a detecting chip is coupled to the output terminal Vout of the fingerprint detecting device 20, A V1 can be obtained by the detecting chip according to ΔV2, thereby obtaining the amount of light detected by the photosensitive sensing component 21. Since the amount of light reflected by the valley of the fingerprint is different from the amount of light reflected by the ridge of the fingerprint, the fingerprint detection can be realized according to the difference in the amount of light detected by different fingerprint detecting devices 20. In the related art, the output terminal Vout of the fingerprint detecting device 20 outputs a current signal, when the current is small, the current signal is easily interfered by noise generated from voltage coupling during the current signal flowing through the signal reading lines and being detected by the detecting chip. However, a voltage detecting method in which the output terminal Vout directly outputs a voltage signal is adopted in the present disclosure, and the coupling voltage is small compared to the detected voltage, thereby improving the anti-noise performance in the fingerprint detection process and improving the detection accuracy.

In some implementations, from the first stage to the second stage, the amount of change in the voltage signal output by the voltage output component 23 to the output terminal Vout of the fingerprint detecting device 20 is A times the amount of change in the potential of the pull-down node PD, where A is greater than 1, thereby achieving voltage amplification.

In the related art, when the fingerprint is detected by using the current signal, since the current is small, it is necessary to provide an amplifier with a large amplification factor at the front end of the detecting chip, and the bias current of the front-end amplifier is required to be small, thereby increasing the manufacturing cost of the detecting chip, and the volume of the detecting chip is increased. In the present disclosure, the voltage output component 23 can supply the voltage signal to the output terminal Vout after amplifying the voltage signal, thereby decreasing design requirements for the detecting chip.

Figure 4:
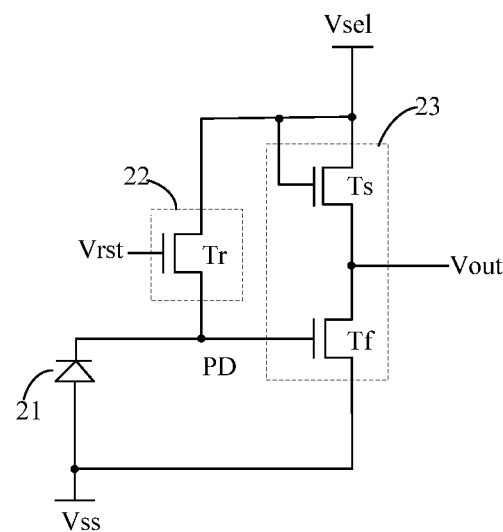
FIG. 4 is a schematic structural diagram of a fingerprint detecting device in an embodiment of the present disclosure.

The specific structure of the fingerprint detecting device 20 is as shown in FIG. 4, wherein the photosensitive sensing component 21 is a photodiode; a first electrode of the photosensitive sensing component 21 is an anode of the photosensitive diode, and a second electrode of the photosensitive sensing component 21 is a cathode of the second photosensitive diode. The reference signal terminal Vss is a low-level signal terminal, for example, a ground terminal.

The reset component 22 includes a reset transistor Tr, a gate of which is coupled to the reset terminal Vrst, a first electrode of which is coupled to the selection terminal Vsel, and a second electrode of which is coupled to the pull-down node PD.

The voltage output component 23 includes a selection transistor Ts and a follower transistor Tf. A gate and a first electrode of the selection transistor Ts are both coupled to the selection terminal Vsel, and a second electrode of the selection transistor Ts and a first electrode of the follower transistor Tf are both coupled to the output terminal Vout of the fingerprint detecting device 20, a gate of the follower transistor Tf is coupled to the pull-down node PD, and a second electrode of the follower transistor Tf is coupled to the reference signal terminal Vss.

In the present disclosure, the reset transistor Tr, the selection transistor Ts, and the follower transistor Tf are all N-type transistors, and accordingly, the reset signal and the selection signal are both high-level signals. Specific operation process of the fingerprint detecting device 20 includes a first stage and a second stage.

In the first stage (i.e., the stage t1 in FIG. 3), a high level signal is supplied to both the reset terminal Vrst and the selection terminal Vsel, so that the reset transistor Tr, the selection transistor Ts and the follower transistor Tf are turned on, the pull-down node PD is reset to be at a high level potential. In the second stage (i.e., the stage t2 in FIG. 3), a low level signal is supplied to the reset terminal Vrst, a high level signal is supplied to the selection terminal Vsel, so that the reset transistor Tr is turned off, when the photodiode is irradiated by light so as to generate current, the potential of the pull-down node PD drops, so that the voltage of the output terminal Vout changes accordingly.

In the first stage and the second stage, since the follower transistor Tf and the selection transistor Ts are coupled to each other in series, the current flowing through the follower transistor Tf is equal to that flowing through the selection transistor Ts, and the pull-down node PD serves as an input node of the voltage output component 23, and the output terminal Vout serves as an output node of the voltage output component 23, then a small signal gain (i.e., the above A) of the voltage output component 23 can be calculated according to the following equation (1):

$$A = gm(Tf)/gm(Ts)$$
$$= \text{sqrt}(2\mu_f C_{oxf}(W/L)_f * I)/\text{sqrt}(2\mu_s C_{oxs}(W/L)_s * I) \quad (1)$$

Where, $\mu_f$ is an electron mobility of the follower transistor Tf; $\mu_s$ is an electron mobility of the selection transistor Ts; $C_{oxf}$ is an unit capacitance of an oxide layer of the follower transistor Tf; $C_{oxs}$ is an unit capacitance of an oxide layer of the selection transistor Ts; $(W/L)_f$ is an aspect ratio of a conductive channel of the follower transistor Tf; $(W/L)_s$ is an aspect ratio of a conductive channel of the selection transistor Ts.

It can be seen that the amplification factor A of voltage signal of the voltage output component 23 can be controlled, so long as selecting the selection transistor Ts and the follower transistor Tf having appropriate parameters.

In some implementations, the unit capacitance and the electron mobility of the oxide layer of the selection transistor Ts are the same as those of the follower transistor Tf, and the above equation (1) can be further simplified as:

$$A = \text{sqrt}((W/L)_f/(W/L)_s) \quad (2)$$

At this time, the amplification factor A is only related to the aspect ratios of the following transistor Tf and the selection transistor Ts.

Figure 5:
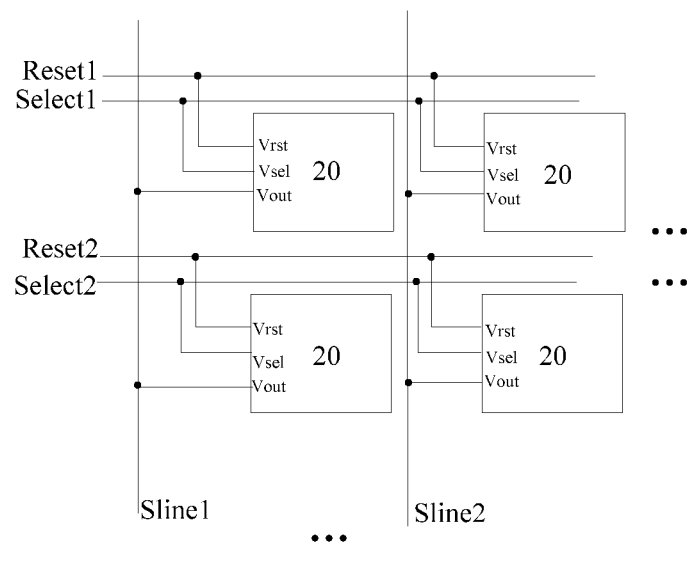
FIG. 5 is a partially structural diagram of a fingerprint detecting circuit in an embodiment of the present disclosure.

In another aspect of the present disclosure, there is provided a fingerprint detecting circuit, as shown in FIG. 5, including a plurality of the above-described fingerprint detecting devices 20.

The plurality of fingerprint detecting devices 20 may be arranged in a plurality of rows and a plurality of columns, and selection terminals Vsel of the fingerprint detecting devices 20 of a same row are coupled to a same selection signal line (such as Select1 or Select2 in FIG. 5), and reset terminals Vrst of the fingerprint detecting devices 20 of a same row are coupled to a same reset signal line (such as Reset1 or Reset2 in FIG. 5); output terminals Vout of the fingerprint detecting devices 20 of a same column are coupled to a same signal reading line (such as Sline1 or Sline2 in FIG. 5). Each signal reading line may be coupled to the detecting chip, so that the detecting chip detects and recognizes a fingerprint through the voltage signals of the signal reading lines.

Figure 6:
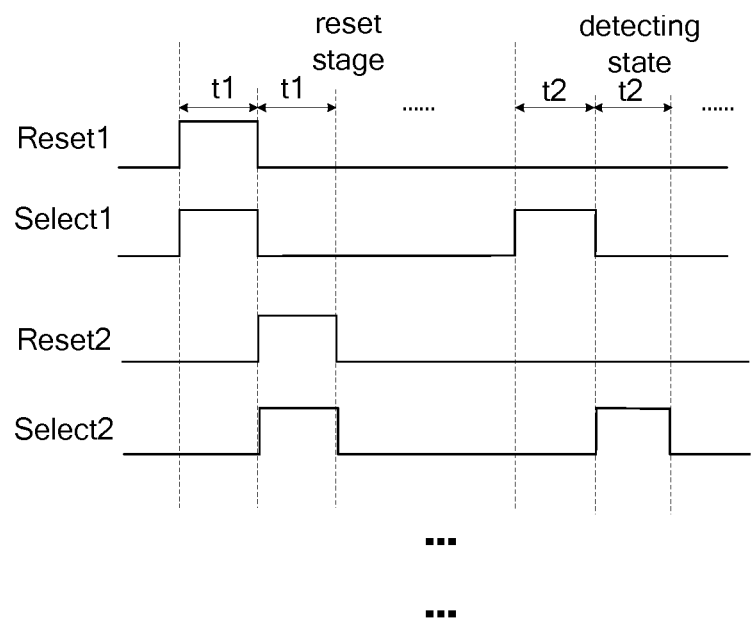
FIG. 6 is a signal timing diagram of the fingerprint detecting circuit of FIG. 5.

In a third aspect of the present disclosure, a driving method for the above fingerprint detecting circuit is provided, the driving method including: a reset stage, in which a reset signal is supplied to the reset terminal Vrst of each fingerprint detecting device 20 to reset the potential of the pull-down node PD of the fingerprint detecting device 20, so that the voltage output component 23 outputs a first voltage signal to the output terminal Vout of the fingerprint detecting device 20 based on the potential of the pull-down node PD. As shown in FIG. 6, reset signals may be supplied to the reset signal lines Reset1, Reset2 and the like line by line to provide reset signals to the fingerprint detecting devices 20 row by row until all the pull-down nodes PD are reset; a detecting state, in which supplying of the reset signals is stopped, and selection signals are provided to the selection terminals Vsel row by row (as shown in FIG. 6, the selection signals are provided to the selection signal lines Select1, Select2 and the like line by line), so that each voltage output component 23 outputs a second voltage signal to the output terminal Vout of the corresponding fingerprint detecting device according to the potential of the pull-down node PD, and a difference between the first voltage signal and the second voltage signal is positively correlated with a difference between the potential of the pull-down node PD in the reset stage and the potential of the pull-down node PD in the detecting stage.

The reset stage is a stage in which the reset terminals Vrst of each the fingerprint detecting devices 20 of all rows receives the reset signal, and the reset stage can be regarded as a combination of the first stages of all the fingerprint detecting devices 20; accordingly, the detecting stage can be regarded as a combination of the second stages of all the fingerprint detecting devices 20.

As described above, each of the reset components 22 includes the reset transistor Tr, and in this case, the reset stage further includes: while supplying a reset signal to the reset terminal Vrst of each of the fingerprint detecting devices, supplying a selection signal to the corresponding selection terminal Vsel such that the reset transistor Tr is turned on according to the reset signal, to connect the pull-down node PD to the selection terminal Vsel, and the pull-down node PD receives the selection signal and is reset.

In a fourth aspect of the present disclosure, there is provided a display apparatus including a display panel 30 and a fingerprint detecting circuit provided on the display panel 30, wherein the fingerprint detecting circuit is the above-described fingerprint detecting circuit provided by the present disclosure.

Figure 7:
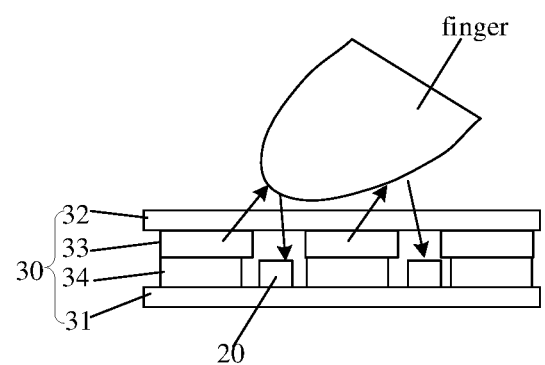
FIG. 7 is a schematic structural diagram of a display apparatus according to an embodiment of the present disclosure.
Figure 8:
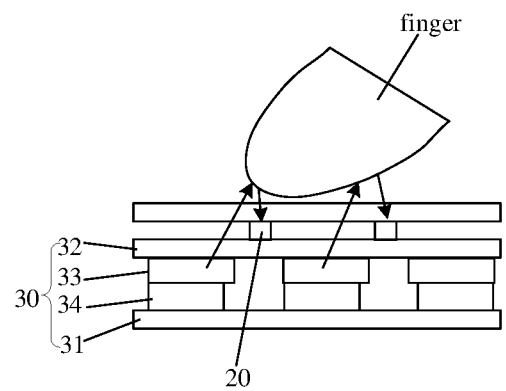
FIG. 8 is a schematic structural diagram of a display apparatus according to another embodiment of the present disclosure.

As shown in FIG. 7 and FIG. 8, the display panel 30 specifically includes a first substrate 31 and a second substrate 32. The fingerprint detecting circuit is provided on a surface of the first substrate 31 facing the second substrate 32 (as shown in FIG. 7), or provided on a surface of the second substrate 32 facing away from the first substrate 31 (as shown in FIG. 8).

The display panel 30 may be a liquid crystal display panel or a self-luminous display panel, for example, an organic light emitting diode display panel. As a specific implementation of the present disclosure, the display panel 30 is an organic electroluminescence display panel. Specifically, the first substrate 31 is provided with a light emitting device 33 and a pixel driving circuit 34 for driving the light emitting device 33 to emit light. When the fingerprint is detected, a portion of light emitted from the light emitting device 33 is reflected by a finger to the fingerprint detecting device 20, thereby enabling fingerprint detection. In some implementations, as shown in FIG. 7, the pixel driving circuit 34 includes a plurality of display transistors, wherein the reset transistor Tr, the selection transistor Ts and the follower transistor Tf are provided in a same layer as the display transistors. Each of the transistors may be a low temperature polysilicon thin film transistor. It should be noted that transistors being provided in a same layer means that the layers of the transistors are provided in same layers respectively, for example, the gates of the transistors are provided in a same layer, the sources and drains of the transistors are provided in a same layer, and the like, which simplifies the fabrication process. In addition, the photosensitive sensing component 21 may be provided in a same layer as the light emitting device 33 or on the light emitting side of the light emitting device 33.

Because the fingerprint detecting device has high anti-noise performance, the overall detection accuracy of the fingerprint detecting circuit adopting the fingerprint detecting device is high, so that the display apparatus provided in the embodiment provides a better experience for the user.

In summary, when the fingerprint detecting device provided by the present disclosure is used for fingerprint detection, since the voltage detection method is adopted, compared with the current detection method, the output terminal of the fingerprint detecting device outputs the voltage signal. The coupling voltage is small compared with the detected voltage, thereby improving the anti-noise performance in the fingerprint detection process and improving the detection accuracy of the fingerprint detecting circuit. Also, the voltage output component can amplify the voltage and output it to the voltage output terminal, thus further improving the anti-noise performance and reducing the fabrication cost and volume of the detecting chip.

It should be understood that, the foregoing embodiments are only exemplary embodiments used for explaining the principle of the present disclosure, but the present disclosure is not limited thereto. Various variations and improvements may be made by a person skilled in the art without departing from the spirit and essence of the present disclosure, and these variations and improvements also fall into the protection scope of the present disclosure.

The invention claimed is:

1. A fingerprint detecting device, comprising:
    a photosensitive sensing component, a first electrode of the photosensitive sensing component is coupled to a reference signal terminal, and a second electrode of the photosensitive sensing component is coupled to a pull-down node;
    a reset component, which is coupled to a reset terminal and the pull-down node, and configured to reset a potential of the pull-down node in a first stage in which the reset terminal receives a reset signal;
    a voltage output component, which is coupled to the pull-down node, a selection terminal and an output terminal of the fingerprint detecting device, and configured to output a voltage signal to the output terminal of the fingerprint detecting device according to the potential of the pull-down node, and from the first stage to a second stage, an amount of change in the voltage signal output to the output terminal of the fingerprint detecting device is positively correlated with an amount of change in the potential of the pull-down node, wherein the second stage is a stage in which the selection terminal receives a selection signal and the reset terminal does not receive the reset signal,
    wherein the reset component comprises a reset transistor, a gate of the reset transistor is coupled to the reset terminal, a first electrode of the reset transistor is directly coupled to the selection terminal, and a second electrode of the reset transistor is coupled to the pull-down node, wherein the voltage output component comprises a selection transistor and a follower transistor; and a gate and a first electrode of the selection transistor are both directly coupled to the selection terminal, and a second electrode of the selection transistor and a first electrode of the follower transistor are directly coupled to the output terminal of the fingerprint detecting device, a gate of the follower transistor is coupled to the pull-down node, and a second electrode of the follower transistor is directly coupled to the reference signal terminal.

2. The fingerprint detecting device according to claim 1, wherein, from the first stage to the second stage, the amount of change in the voltage signal output from the voltage output component to the output terminal of the fingerprint detecting device is A times the amount of change in the potential of the pull-down node, where A is greater than 1.

3. The fingerprint detecting device according to claim 1, wherein an oxide layer of the selection transistor and an oxide layer of the follower transistor have a same unit capacitance and a same electron mobility.

4. The fingerprint detecting device according to claim 1, wherein the photosensitive sensing component is a photodiode.

5. The fingerprint detecting device according to claim 1, wherein the reference signal terminal is a low-level signal terminal.

6. A fingerprint detecting circuit, comprising a plurality of fingerprint detecting devices according to claim 1.

7. The fingerprint detecting circuit according to claim 6, wherein, from the first stage to the second stage, the amount of change in the voltage signal output from the voltage output component to the output terminal of the fingerprint detecting device is A times the amount of change in the potential of the pull-down node, where A is greater than 1.

8. The fingerprint detecting circuit according to claim 6, wherein the reset component includes a reset transistor, a gate of the reset transistor is coupled to the reset terminal, a first electrode of the reset transistor is coupled to the selection terminal, and a second electrode of the reset transistor is coupled to the pull-down node.

9. The fingerprint detecting circuit according to claim 6, wherein the voltage output component comprises a selection transistor and a follower transistor;

a gate and a first electrode of the selection transistor are both coupled to the selection terminal, and a second electrode of the selection transistor and a first electrode of the follower transistor are coupled to an output terminal of the fingerprint detecting device, a gate of the follower transistor is coupled to the pull-down node, and a second electrode of the follower transistor is coupled to the reference signal terminal.

10. The fingerprint detecting circuit according to claim 9, wherein an oxide layer of the selection transistor and an oxide layer of the follower transistor have a same unit capacitance and a same electron mobility.

11. The fingerprint detecting circuit according to claim 6, wherein the photosensitive sensing component is a photodiode.

12. The fingerprint detecting circuit according to claim 6, wherein selection terminals of the fingerprint detecting devices of a same row are coupled to a same selection signal line, and reset terminals of the fingerprint detecting devices of a same row are coupled to a same reset signal line; output terminals of fingerprint detecting devices of a same column are coupled to a same signal reading line.

13. A driving method for a fingerprint detecting circuit according to claim 12, comprising a reset stage and a detecting stage, wherein in the reset stage, a reset signal is supplied to the reset terminal of each of the fingerprint detecting devices to reset the potential of the pull-down node of the fingerprint detecting device, so that the voltage output component outputs a first voltage signal to the output terminal of the fingerprint detecting device based on the potential of the pull-down node;

in the detecting stage, the supplying of the reset signal is stopped, and selection signals are supplied to the selection terminals row by row such that each of voltage output components of the fingerprint detecting devices outputs a second voltage signal to the output terminal of corresponding one of the fingerprint detecting devices based on the potential of the pull-down node, and a difference between the first voltage signal and the second voltage signal is positively correlated with a difference between the potential of the pull-down node in the reset stage and the potential of the pull-down node in the detecting stage, wherein the reset component of fingerprint detecting device comprises a reset transistor, a gate of the reset transistor is coupled to the reset terminal, a first electrode of the reset transistor is coupled to the selection terminal, and a second electrode of the reset transistor is coupled to the pull-down node, and wherein the reset stage further comprises a step of supplying a selection signal to the selection terminal of each of the fingerprint detecting devices while supplying a reset signal to the reset terminal of each of the fingerprint detecting devices.

14. A display apparatus, comprising a display panel and a fingerprint detecting circuit according to claim 6, which is provided on the display panel.

15. The display apparatus according to claim 14, wherein the display panel comprises a first substrate and a second substrate provided opposite to each other, and the fingerprint detecting circuit is provided on a side of the first substrate facing the second substrate.

16. The display apparatus of claim 15, wherein the reset component comprises a reset transistor, the voltage output component comprises a selection transistor and a follower transistor;

the first substrate is provided with a light emitting device and a pixel driving circuit for driving the light emitting device to emit light, the pixel driving circuit comprises a plurality of display transistors, wherein the reset transistor, the selection transistor and the follower transistor are provided in the same layer as the display transistors.

17. The display apparatus according to claim 14, wherein the display panel includes a first substrate and a second substrate provided opposite to each other, and the fingerprint detecting circuit is provided on a side of the second substrate facing away from the first substrate.

* * * * *